United States Patent
Ichikawa et al.

(10) Patent No.: US 7,891,499 B2
(45) Date of Patent: Feb. 22, 2011

(54) CARBON MEMBRANE LAMINATED BODY AND METHOD FOR MANUFACTURING THE SAME

(75) Inventors: Akimasa Ichikawa, Nagoya (JP); Miyuki Yabuki, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 12/471,532

(22) Filed: May 26, 2009

(65) Prior Publication Data

US 2009/0242478 A1    Oct. 1, 2009

Related U.S. Application Data

(63) Continuation of application No. PCT/JP2007/072708, filed on Nov. 19, 2007.

(30) Foreign Application Priority Data

Nov. 29, 2006    (JP) .............................. 2006-321040

(51) Int. Cl.
  *B01D 69/12* (2006.01)
  *B01D 71/06* (2006.01)
  *B01D 71/64* (2006.01)
  *B01D 67/00* (2006.01)
  *B01D 53/22* (2006.01)

(52) U.S. Cl. .............................. 210/490; 96/11; 96/12; 210/483; 210/488; 210/489; 210/500.21; 210/506; 427/228

(58) Field of Classification Search .................. 210/483, 210/488, 489, 490, 500.21, 503, 504, 506, 210/510.1; 96/11, 12, 13; 427/228
See application file for complete search history.

(56) References Cited

U.S. PATENT DOCUMENTS 7,621,979 B2 * 11/2009 Kaigawa et al. ................ 95/50

2004/0050249 A1    3/2004 Corbin et al.
2006/0159718 A1    7/2006 Rathenow et al.

FOREIGN PATENT DOCUMENTS

| EP | 0 474 424 A2 | | 3/1992 |
|---|---|---|---|
| JP | 60-179102 A1 | | 9/1985 |
| JP | 3647985 B2 | | 2/1998 |
| JP | 2002-066280 A | * | 3/2002 |
| JP | 3698107 B2 | | 8/2003 |
| WO | 00/53299 A1 | | 9/2000 |
| WO | 01/97956 A1 | | 12/2001 |

OTHER PUBLICATIONS

English Translation Japanese Patent Application No. 2002-066280 A.*

* cited by examiner

*Primary Examiner*—John Kim
(74) *Attorney, Agent, or Firm*—Burr & Brown

(57) ABSTRACT

A carbon membrane laminated body includes: a porous substrate, a first porous carbon membrane as a carbon membrane underlayer disposed on a surface of the porous substrate, and a second porous carbon membrane as a carbon membrane separation layer disposed on a surface of the carbon membrane underlayer, having a smaller film thickness, and a smaller average pore diameter, compared with those of the carbon membrane underlayer. It is preferable to form the carbon membrane underlayer and the carbon membrane separation layer by carbonizing a carbon membrane underlayer precursor disposed on a surface of the porous substrate and the carbon membrane separation layer precursor disposed on a surface of the carbon membrane underlayer precursor at 400 to 1000° C. in a non-oxidation atmosphere. The carbon membrane laminated body is a separation membrane excellent in both separation performance and flux when it is used as a separation membrane of a mixture.

14 Claims, No Drawings

CARBON MEMBRANE LAMINATED BODY AND METHOD FOR MANUFACTURING THE SAME

FIELD OF THE INVENTION

The present invention relates to a carbon membrane laminated body and a method for manufacturing the same. More specifically, the present invention relates to a carbon membrane laminated body which is a separation membrane excellent in both separation performance and flux when the carbon membrane laminated body is used as a separation membrane for a mixture and to a method for manufacturing the same.

BACKGROUND OF THE INVENTION

Development of separation membranes for filtrating and separating a specific gas or the like from a mixture of various kinds of gas or the like has been proceeding from the viewpoint of an environment or energy saving. As such a separation membrane, there have been known polymer films such as a polysulfonic film, a silicon film, a polyamide film, and a polyimide film. However, such a film has a problem in chemical resistance or thermal resistance, for example, easy change in quality and deterioration of the film when an organic solvent is contained in the mixture.

On the other hand, a carbon membrane is excellent in thermal resistance and chemical stability as a separation membrane, and a separation membrane having a porous body and a carbon membrane formed thereon has been known. For example, Japanese Patent No. 3647985 discloses a carbon molecular sieve membrane manufactured by forming a coating layer of silica sol, alumina sol, or the like on a surface of a ceramic porous body and forming a carbon membrane adhering to a surface of the coating layer. Since a large number of pores each having a pore diameter of 1 nm or less are present in the carbon molecular sieve membrane, components having a specific molecular diameter can be separated from a mixture of various kinds of gas having different molecular diameters and refined. In addition, Japanese Patent No. 3698107 discloses a gas separation membrane obtained by eliminating a substituent from an aromatic polyimide film having a substituent (sulfonic acid group) capable of being eliminated by thermal decomposition and heating the aromatic polyimide film so that an imide framework may remain.

As disclosed in Japanese Patent No. 3647985, in a method of impregnating the surface of the porous body (porous substrate) with silica sol and forming a carbon membrane thereon, a pore diameter of the carbon membrane increases due to formation of a sol layer. Therefore, separation performance is improved with respect to some kinds of gas having a molecule diameter of 0.43 nm or more and a relatively high molecular weight as in the case of separating a mixed gas of $C_3H_8$ and $C_3H_6$. However, it has been found that selectivity deteriorates with respect to a substance having a relatively small molecular weight as in separation of a mixed gas of $CO_2$ and $CH_4$, separation of a mixed gas of $N_2$ and $O_2$, and separation of a mixture of water and EtOH, which are industrially useful. Further, a flux is low by the influence of pressure loss due to silica sol, and the separation performance is lower than a method of forming a carbon membrane directly on a porous substrate as before.

In order to enhance both the selectivity and the flex of separation of a mixture using a general carbon membrane formed of one kind of a precursor, there is a method where a molecular structure of a precursor is changed so as to increase the number of pores which contribute to separation or a thickness of the membrane is further decreased. However, there is a limitation on increase in the number of pores by changing a molecular structure, and defects increase when the membrane thickness is decreased to 1 μm or less. Therefore, selectivity deteriorates.

SUMMARY OF THE INVENTION

The present invention has been made in view of the above problems and aims to provide a carbon membrane laminated body excellent in both the separation performance and the flux when it is used as a separation membrane for a mixture and a manufacturing method therefor.

In order to achieve the aim, there is provided the following carbon membrane laminated body and manufacturing method therefor.

[1] A carbon membrane laminated body comprising: a porous substrate, a first porous carbon membrane (carbon membrane underlayer) disposed on the surface of the porous substrate, and a second porous carbon membrane (carbon membrane separation layer) disposed on a surface of the carbon membrane underlayer, having a smaller thickness and a smaller average pore diameter than those of the carbon membrane underlayer.

[2] A carbon membrane laminated body according to [1], wherein the carbon membrane underlayer and the carbon membrane separation layer are formed by carbonizing a carbon membrane underlayer precursor (underlayer precursor) disposed on a surface of the porous substrate and a carbon membrane separation layer precursor (separation layer precursor) disposed on a surface of the underlayer precursor at 400 to 1000° C. in a non-oxidation atmosphere.

[3] A carbon membrane laminated body according to [2], wherein the underlayer precursor is a layer containing a polyimide resin as a main component.

[4] A carbon membrane laminated body according to [2], wherein the separation layer precursor is a layer containing lignin as a main component.

[5] A carbon membrane laminated body according to any one of [1] to [4], wherein the carbon membrane underlayer has a thickness of 0.05 to 5.0 μm, and the carbon membrane separation layer has a thickness of 0.001 to 1.0 μm.

[6] A carbon membrane laminated body according to any one of [1] to [5], wherein the carbon membrane underlayer has an average pore diameter of 0.2 to 100 nm, and the carbon membrane separation layer has an average pore diameter of 0.1 to 5.0 nm.

[7] A carbon membrane laminated body according to [6], wherein the carbon membrane underlayer has an average pore diameter of 0.2 to 10 nm, and the carbon membrane separation layer has an average pore diameter of 0.1 to 1.0 nm.

[8] A method for manufacturing a carbon membrane laminated body comprising the steps of: disposing a first carbon membrane precursor (underlayer precursor) on a porous substrate to form an underlayer precursor-disposed body, disposing a second carbon membrane precursor (separation membrane precursor) which is thinner than the underlayer precursor on a surface of the underlayer precursor to form a carbon membrane precursor laminated body, and subjecting the carbon membrane precursor laminated body to a thermal treatment for carbonization of the underlayer precursor and the separation layer precursor to form respectively a carbon membrane underlayer disposed on a surface of the porous substrate and a carbon membrane separation layer disposed on a surface of the carbon membrane underlayer; the carbon membrane separation layer having a smaller average pore diameter and a smaller membrane thickness than those of the carbon membrane underlayer.

[9] A method for manufacturing a carbon membrane laminated body according to [8], wherein the thermal treatment is performed at 400 to 1000° C. in a non-oxidation atmosphere.

[10] A method for manufacturing a carbon membrane laminated body according to [8] or [9], wherein the underlayer precursor is a layer containing a polyimide resin as a main component.

[11] A method for manufacturing a carbon membrane laminated body according to any one of [8] to [10], wherein the separation layer precursor is a layer containing lignin as a main component.

[12] A method for manufacturing a carbon membrane laminated body according to any one of [8] to [11], wherein the carbon membrane underlayer has a thickness of 0.05 to 5.0 μm, and the carbon membrane separation layer has a thickness of 0.001 to 1.0 μm.

[13] A method for manufacturing a carbon membrane laminated body according to any one of [8] to [12], wherein the carbon membrane underlayer has an average pore diameter of 0.2 to 100 nm, and the carbon membrane separation layer has an average pore diameter of 0.1 to 5.0 nm.

[14] A carbon membrane laminated body according to [13], wherein the carbon membrane underlayer has an average pore diameter of 0.2 to 10 nm, and the carbon membrane separation layer has an average pore diameter of 0.1 to 1.0 nm.

According to a carbon membrane laminated body of the present invention, since a carbon membrane separation layer disposed on a surface side has a smaller membrane thickness and a smaller average pore diameter than those of a carbon membrane underlayer, it is possible to exhibit selectivity (separation performance) upon separation by the carbon membrane separation layer with maintaining a high flux by the carbon membrane underlayer.

DETAILED DESCRIPTION OF THE INVENTION

Hereinbelow, the best embodiment for carrying out the invention will concretely be described. However, the present invention is by no means limited to the following embodiment, and it should be understood that changes, improvements, or the like, may be added to the design on the basis of knowledge of those skilled in the art within the range of not deviating from the gist of the present invention.

An embodiment of a carbon membrane laminated body of the present invention is provided with a porous substrate, a porous carbon membrane (carbon membrane underlayer) disposed on a surface of the porous substrate, and another porous carbon membrane (carbon membrane separation layer) disposed on a surface of the carbon membrane underlayer, having a smaller membrane thickness and a smaller average pore diameter than those of the carbon membrane underlayer.

In a carbon membrane laminated body of the present embodiment, the carbon membrane underlayer is a porous carbon membrane disposed on a surface of the porous substrate. The carbon membrane underlayer has a thickness of preferably 0.05 to 5.0 μm, more preferably 0.05 to 1.0 μm. When it is thinner than 0.05 μm, the carbon membrane may have a defect. When it is thicker than 5.0 μm, a flux upon separation of a mixture may deteriorate. The carbon membrane underlayer has an average pore diameter of preferably 0.2 to 100 nm, more preferably 0.2 to 10 nm. The average pore diameter is measured by a gas adsorption method.

The carbon membrane underlayer is preferably formed by carbonizing a carbon membrane underlayer precursor (underlayer precursor) with a carbon membrane separation layer precursor (separation layer precursor) disposed on a surface of the underlayer precursor at 400 to 1000° C. in a non-oxidation atmosphere. The non-oxidation atmosphere means an atmosphere where the underlayer precursor and the separation layer precursor are not oxidized even if they are heated in the above temperature range and is an atmosphere in an inert gas such as nitrogen and argon or in a vacuum.

A material for the underlayer precursor is not particularly limited, and a material containing, for example, a polyimide resin as the main component can suitably be employed. Here, the main component means a component contained at 60% by mass or more. Further, it is preferable to form a polyimide resin film (layer) which is a precursor of a carbon membrane by applying a polyamide acid shown by the following general formula (3) (X and Y in the formula is the same groups as those described below.) which is a precursor of a polyimide resin whose repeated unit is shown by the following general formula (1) (where X represents a tetravalent group selected from the group consisting of an aliphatic group having 2 to 27 carbon atoms, a cyclic aliphatic group, a monocyclic aromatic group, a condensed polycyclic aromatic group, and uncondensed polycyclic aromatic group having aromatic groups mutually joined directly or by a crosslinking member, n represents an integer of 5 to 10000; Y is shown by the following general formula (2), where at least one phenylene group forming the main chain framework is a m-phenylene group, Z represents direct link, —O—, —CO—, —S—, —SO$_2$—, —CH$_2$—, —C(CH$_3$)$_2$—, or —C(CF$_3$)$_2$—, m represents an integer of 1 to 3, R$_{1-4}$ and R'$_{1-4}$ are —H, —F, —Cl, —Br, —I, —CN, —CH$_3$, —CF$_3$, —OCH$_3$, a phenyl group, a 4-phenylphenyl group, a phenoxy group, or a 4-phenylphenoxy group, and R$_{1-4}$ and R'$_{1-4}$ may be the same or different, and a part of them may be the same.), followed by heating and drying.

[formula 1]

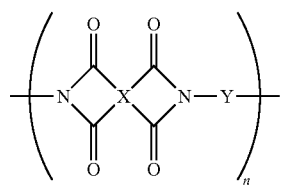

(1)

[formula 2]

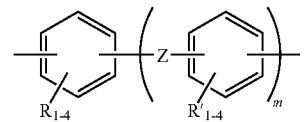

(2)

[formula 3]

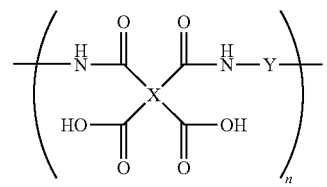

(3)

In a carbon membrane laminated body of the present invention, the carbon membrane separation layer is disposed on a surface of the carbon membrane underlayer. The carbon membrane separation layer is a carbon membrane having a smaller thickness and a smaller average pore diameter than those of the carbon membrane underlayer. The carbon membrane separation layer has a thickness of preferably 0.001 to 1.0 μm, more preferably 0.001 to 0.1 μm. When the layer is thinner than 0.001 μm, the carbon membrane may have a defect to cause deterioration in separation. When it is thicker than 1.0 μm, a flux upon separation of a mixture may deteriorate. The carbon membrane separation layer has an average pore diameter of preferably 0.1 to 5.0 nm, more preferably 0.1 to 1.0 nm.

Thus, the carbon membrane separation layer is thinner than the carbon membrane underlayer, and the carbon membrane separation layer has a smaller average pore diameter than that of the carbon membrane underlayer. Therefore, it is possible to enhance selectivity (separation performance) upon separation by the carbon membrane separation layer with maintaining a high flux by the carbon membrane underlayer.

It is preferable that the carbon membrane separation layer is formed by being carbonized at 400 to 1000° C. in a non-oxidation atmosphere with the underlayer precursor disposed between the separation layer precursor and the porous substrate. The optimum kind of the precursors and the optimum carbonization temperature are different depending on a target for separation. In the case that the precursors of the carbon membrane underlayer (underlayer) and the carbon membrane separation layer (separation layer) are independently formed on a porous substrate and carbonized at a certain temperature, it is preferable that the carbon membrane of the underlayer has a high flux with respect to the target for separation and that the carbon membrane of the separation layer has high selectivity and an excellent flux.

A material for the separation layer precursor is not particularly limited, and a material containing, for example, lignin as the main component can suitably be employed. Lignin is a component occupying 20 to 30 percent in wood and extracted from a liquid waste or the like in a process for manufacturing pulp. A large number of lignin goods are on the market. It is possible to use, as the separation layer precursor in the present embodiment, lignin products on the market, derivatives from the lignin products, or lignin extracted from wood by oneself.

The porous substrate is not particularly limited in a carbon membrane laminated body of the present embodiment. However, it is preferably obtained by depositing alumina particles having an average particle diameter of 0.3 to 10 μm on a monolith-shaped alumina porous substrate having an average pore diameter of 1 to 30 μm by a filtration membrane-forming method, followed by firing to form the first surface dense layer having a thickness of 10 to 1000 μm and an average pore diameter of 0.1 to 3 μm and further depositing alumina particles having an average particle diameter of 0.03 to 1 μm on the first surface dense layer, followed by firing to form the second surface dense layer having a thickness of 1 to 100 μm and an average pore diameter of 0.01 to 0.5 μm. The porosity is preferably 20 to 80%, more preferably 30 to 70%. As particles constituting the porous substrate, ceramic particles are preferable. Specifically, alumina particles, silica particles, cordierite particles, zirconia particles, mullite particles, and the like, are preferable.

There is no particular limitation on the shape of the porous substrate (and the shape of the carbon membrane laminated body), and the shape may be determined depending on the purpose to be, for example, a disc shape, a polygonal shape, a cylindrical shape such as a circular cylindrical shape or a square cylindrical shape, and a columnar shape such as a circular columnar shape or a square columnar shape. There is no limitation on the size of the porous substrate (and the size of the carbon membrane laminated body), and the size can be determined depending on the purpose within the range where required strength as a support can be satisfied and where permeability of gas to be separated is not spoiled. A monolith shape is particularly desirable because of a high percentage of a membrane area with respect to capacity.

Next, an embodiment of a method for manufacturing a carbon membrane laminated body of the present invention will be described.

A method for manufacturing a carbon membrane laminated body of the present embodiment is a method comprising the steps of: disposing the first carbon membrane precursor (underlayer precursor) on a porous substrate to form an underlayer precursor-disposed body, disposing the second carbon membrane precursor (separation membrane precursor) which is thinner than the underlayer precursor on a surface of the underlayer precursor-disposed body to form a carbon membrane precursor laminated body, and carbonizing the separation layer precursor with the underlayer precursor to form respectively a carbon membrane underlayer disposed on a surface of the porous substrate and a carbon membrane separation layer disposed on a surface of the carbon membrane underlayer; the carbon membrane separation layer having a smaller average pore diameter and having a smaller membrane thickness than those of the carbon membrane underlayer.

The porous substrate to be used in a method for manufacturing a carbon membrane laminated body of the present embodiment is preferably the same as the porous substrate described in the above embodiment of a carbon membrane laminated body of the present invention.

In a method for manufacturing a carbon membrane laminated body of the present embodiment, in the first place, the first carbon membrane precursor (underlayer precursor) is disposed on a surface of the porous substrate to form an underlayer precursor-disposed body. As a material for the underlayer precursor, it is preferable to use a material containing as the main component a polyimide resin similar to that mentioned for the underlayer precursor in the aforementioned embodiment of a carbon membrane laminated body of the present invention.

In the case of disposing a polyimide resin on a surface of the porous substrate, in the first place, a polyamide acid, which is a precursor of a polyimide resin, is applied on a surface of the porous substrate. It is preferable that a polyamide acid is diluted by an organic solvent such as N,N-dimethylacetamide or N-methyl-2-pyrrolidone in a percentage of 1 to 40% by mass and applied on a surface of the porous substrate by spin coating, dipping, or the like. Then, the porous substrate with the polyamide acid applied thereon is thermally treated under the conditions of 90 to 300° C. for 0.5 to 60 hours to obtain an underlayer precursor-disposed body where a polyimide resin, which is a precursor of the carbon membrane, is disposed on a surface of the porous substrate. The underlayer precursor has a thickness of preferably 0.05 to 5.0 μm, more preferably 0.05 to 1.0 μm.

The polyamide acid applied on the porous substrate is preferably a polyamide acid shown by the following general formula (3) (where X and Y in the formula are the same groups as those described below.) which is a precursor of a polyimide resin whose repeated unit is shown by the following general formula (1) (where X represents a tetravalent group selected from the group consisting of an aliphatic group having 2 to 27 carbon atoms, a cyclic aliphatic group, a monocyclic aromatic group, a condensed polycyclic aromatic group, and uncondensed polycyclic aromatic group having aromatic groups mutually joined directly or by a crosslinking member, n represents an integer of 5 to 10000; Y is shown by the following general formula (2), where at least one phenylene group forming the main chain framework is a m-phenylene group, Z represents direct link, —O—, —CO—, —S—, —$SO_2$—, —$CH_2$—, —$C(CH_3)_2$—, or —$C(CF_3)_2$—, m represents an integer of 1 to 3, $R_{1-4}$ and $R'_{1-4}$ are —H, —F, —Cl, —Br, —I, —CN, —$CH_3$, —$CF_3$, —$OCH_3$, a phenyl group, a 4-phenylphenyl group, a phenoxy group, or a 4-phenylphenoxy group, and $R_{1-4}$ and $R'_{1-4}$ may be the same or different, and a part of them may be the same).

[formula 4]

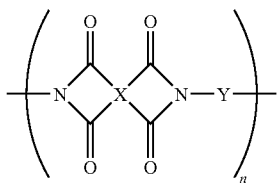
(1)

[formula 5]

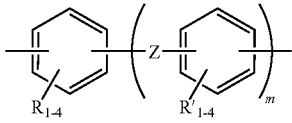
(2)

[formula 6]

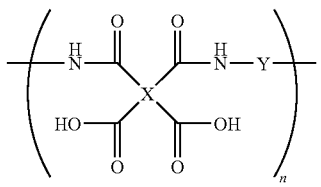
(3)

The aforementioned polyamide acid to be a precursor of a polyimide resin may be manufactured in any method. The above polyamide acid can be prepared by using a diamine shown by the following general formula (4) (where at least one of the phenylene groups linking an amino group with Z and/or Z with Z is a m-phenylene group, Z represents direct link, —O—, —CO—, —S—, —$SO_2$—, —$CH_2$—, —$C(CH_3)_2$—, or —$C(CF_3)_2$—, m represents an integer of 1 to 3, $R_{1-4}$ and $R'_{1-4}$ are —H, —F, —Cl, —Br, —I, —CN, —$CH_3$, —$CF_3$, —$OCH_3$, a phenyl group, a 4-phenylphenyl group, a phenoxy group, or a 4-phenylphenoxy group, and $R_{1-4}$ and $R'_{1-4}$ may be the same or different, and a part of them may be the same) and a tetracarboxylic acid dianhydride shown by the following general formula (5) (wherein X represents a tetravalent group selected from the group consisting of an aliphatic group having 2 to 27 carbon atoms, a cyclic aliphatic group, a monocyclic aromatic group, a condensed polycyclic aromatic group, and uncondensed polycyclic aromatic group having aromatic groups mutually joined directly or by a crosslinking member) as a monomer.

[formula 7]

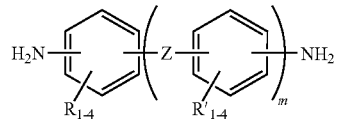
(4)

[formula 8]

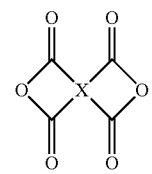
(5)

Next, the second carbon membrane precursor (separation layer precursor) thinner than the underlayer precursor is disposed on a surface of the underlayer precursor disposed on a surface of the porous substrate to form a carbon membrane precursor laminated body. The carbon membrane precursor laminated body is a body prepared by disposing an underlayer precursor on a surface of the porous substrate and further disposing a separation layer precursor on a surface of the underlayer precursor. A material for the separation layer precursor preferably contains the same lignin as the lignin described for the separation layer precursor in the embodiment of a carbon membrane laminated body of the present invention as the main component. The separation layer precursor preferably has a thickness of 0.001 to 1.0 μm, more preferably 0.001 to 0.1 μm. As a method for disposing a separation layer precursor, a dipping method or the like may be employed.

Then, the separation layer precursor is carbonized together with the underlayer precursor to form a carbon membrane separation layer disposed on a surface of the carbon membrane underlayer, and thereby a carbon membrane laminated body where the carbon membrane separation layer has a smaller average pore diameter and a smaller membrane thickness than those of the carbon membrane underlayer can be obtained.

The atmosphere for thermally treating the carbon membrane precursor laminated body is preferably a non-oxidation atmosphere. The non-oxidation atmosphere means an atmosphere where the underlayer precursor and the separation layer precursor are not oxidized even if they are heated in the temperature range for the thermal treatment and, specifically, an atmosphere in an inert gas such as nitrogen and argon or in a vacuum.

Though the optimum temperature for thermally treating a carbon membrane precursor laminated body is different depending on the kinds of the precursors, the temperature is preferably 400 to 1000° C., further preferably 500 to 900° C., particularly preferably 600 to 800° C. When the temperature is below 400° C., separation performance is not exhibited because pores are not formed because of insufficient carbonization. When the temperature is above 1000° C., strength may deteriorate, or separation performance may deteriorate because the film is too dense.

By subjecting the carbon membrane precursor laminated body to the thermal treatment, the underlayer precursor is carbonized to form a carbon membrane underlayer, and the separation layer precursor is carbonized to form a carbon membrane separation layer in the state that it is disposed on a surface of the carbon membrane underlayer. Thus, by thermally treating the underlayer precursor and the separation layer precursor at the same time for carbonization, production efficiency can be enhanced, and the carbon membrane underlayer and the carbon membrane separation layer can unitarily be joined firmly. Further, the carbon membrane separation layer obtained by carbonizing the separation layer precursor containing lignin as the main component has a smaller average pore diameter than that of the carbon membrane underlayer obtained by carbonizing the underlayer precursor containing a polyimide resin as the main component. This is because pore formation and densification of lignin proceeds at lower temperature than that of a polyimide resin. In addition, since the separation layer precursor is thinner than the underlayer precursor, the carbon membrane separation layer is thinner than the carbon membrane underlayer.

In the carbon membrane laminated body obtained above, the carbon membrane underlayer has a thickness of preferably 0.05 to 5.0 μm, more preferably 0.05 to 1.0 μm. The carbon membrane separation layer has a thickness of preferably 0.001 to 1.0 μm, more preferably 0.001 to 0.1 μm.

In addition, in the carbon membrane laminated body obtained above, the carbon membrane underlayer has an average pore diameter of preferably 0.2 to 100 nm, more preferably 0.2 to 10 nm. The carbon membrane separation layer has an average pore diameter of preferably 0.1 to 5.0 nm, more preferably 0.1 to 1.0 nm.

EXAMPLE

Hereinbelow, the present invention will be described more specifically with Examples. However, the present invention is by no means limited to these Examples.

Example 1

A carbon membrane laminated body was manufactured by the following method.
(Porous Substrate)
A porous substrate of a monolith-shaped alumina porous body was used. The surface of the porous substrate had an average pore diameter of 0.01 to 0.5 μm, and the porosity of the entire porous substrate was 30 to 70%.
(Preparation of a Solution for Forming the Underlayer Precursor)
A polyimide resin precursor varnish (polyamic acid solution) on the market was adjusted to have a concentration of 10% by mass to obtain a solution (precursor A) for forming an underlayer precursor.

(Preparation of a Solution for Forming the Separation Layer Precursor)
A lignin (organosolv) on the market was dissolved in N-methyl-2-pyrrolidone to have a concentration of 5 or 10% by mass to obtain a solution (precursor B) for forming a separation layer precursor.
(Membrane-Forming)
The porous substrate was dip-coated with the solution for forming an underlayer precursor (precursor A) and dried at 200° C. for one hour. This operation was performed once to ten times to form an underlayer precursor-disposed body. Next, the underlayer precursor-disposed body was dip-coated with a solution for forming a separation layer precursor (precursor B) and dried at 100° C. for one hour to form a carbon membrane precursor laminated body. The dip-coating of the underlayer precursor-disposed body with a solution for forming a separation layer precursor was performed once to three times.
(Thermal Treatment)
The carbon membrane precursor laminated body formed by disposing the underlayer precursor and the separation layer precursor on the porous substrate was carbonized by a thermal treatment at 700° C. for one hour in a non-oxidation atmosphere to obtain a carbon membrane laminated body (Example 1). Here, as the non-oxidation atmosphere, a vacuum atmosphere was employed. After the carbonization, the carbon membrane underlayer had a film thickness of 1 μm, and the carbon membrane separation layer had a film thickness of 0.1 μm. The average pore diameter of each of the carbon membrane underlayer (underlayer) and the carbon membrane separation layer (separation layer) is shown in Table 1. The carbon membrane laminated body has a structure where a carbon membrane is formed on wall surfaces of a plurality of flow passage of the monolith-shaped porous substrate.

Incidentally, the film thickness of each of the carbon membrane underlayer and the carbon membrane separation layer was measured using an electron microscope, and the average porous diameter was measured using a gas adsorption method.

The carbon membrane laminated body obtained in Example 1 was subjected to a separation test by a water-ethanol pervaporation method, and the separation factor and the flux were measured. As the test conditions for both Examples and Comparative Examples, a ratio of $H_2O:EtOH$ in terms of mass was 10:90 at a temperature of 75° C. The results are shown in Table 1.

TABLE 1

| | Concentration of precursor A (mass %) | Concentration of precursor B (mass %) | Carbonization temperature (° C.) | Separation coefficient | Flux (kg/m²h) | Average pore diameter | |
|---|---|---|---|---|---|---|---|
| | | | | | | Underlayer (nm) | Separation layer (nm) |
| Example 1 | 10 | 5 | 700 | 150 | 1.7 | 0.54 | 0.39 |
| Example 2 | 10 | 5 | 600 | 130 | 2.5 | 0.65 | 0.40 |
| Comparative Example 1 | 10 | — | 600 | 5 | 2.5 | 0.65 | — |
| Comparative Example 2 | 10 | — | 700 | 15 | 1.7 | 0.54 | — |
| Comparative Example 3 | 10 | — | 800 | 120 | 0.8 | 0.40 | — |

TABLE 1-continued

|  | Concentration of precursor A (mass %) | Concentration of precursor B (mass %) | Carbonization temperature (° C.) | Separation coefficient | Flux (kg/m²h) | Average pore diameter Underlayer (nm) | Average pore diameter Separation layer (nm) |
|---|---|---|---|---|---|---|---|
| Comparative Example 4 | — | 10 | 700 | 150 | 0.5 | 0.39 | — |
| Comparative Example 5 | — | 10 | 600 | 130 | 0.7 | 0.40 | — |

Example 2

A carbon membrane laminated body was manufactured in the same manner as in Example 1 except that the temperature for carbonizing the carbon membrane precursor laminated body was 600° C. After the carbonization, the carbon membrane underlayer had a film thickness of 1 μm, and the carbon membrane separation layer had a film thickness of 0.1 μm. The average pore diameter of each of the carbon membrane underlayer (underlayer) and the carbon membrane separation layer (separation layer) is shown in Table 1. A separation test was performed by a water-ethanol pervaporation method, and the separation factor and the flux were measured. The results are shown in Table 1.

Comparative Example 1

A carbon membrane laminated body was manufactured in the same manner as in Example 2 except that the operation of forming a carbon membrane precursor laminated body by dip-coating the underlayer precursor-disposed body with a solution for forming a separation layer precursor was not performed. The underlayer precursor-disposed body was subjected to a thermal treatment. After the carbonization, the carbon membrane had a film thickness of 1 μm. The average pore diameter of the carbon membrane is shown in the column of "Underlayer" in Table 1. A separation test was performed by a water-ethanol pervaporation method, and the separation factor and the flux were measured. The results are shown in Table 1. Incidentally, the carbon membrane was measured for the film thickness with an electron microscope, and the average pore size was measured by a gas adsorption method.

Comparative Example 2

A carbon membrane laminated body was manufactured in the same manner as in Example 1 except that the operation of forming a carbon membrane precursor laminated body by dip-coating the underlayer precursor-disposed body with a solution for forming a separation layer precursor was not performed. The underlayer precursor-disposed body was subjected to a thermal treatment. After the carbonization, the carbon membrane had a film thickness of 1 μm. The average pore diameter of the carbon membrane is shown in the column of "Underlayer" in Table 1. A separation test was performed by a water-ethanol pervaporation method, and the separation factor and the flux were measured. The results are shown in Table 1.

Comparative Example 3

A carbon membrane laminated body was manufactured in the same manner as in Comparative Example 1 except that the temperature for carbonizing the underlayer precursor-disposed body was 800° C. After the carbonization, the carbon membrane had a film thickness of 1 μm. The average pore diameter of the carbon membrane is shown in the column of "Underlayer" in Table 1. A separation test was performed by a water-ethanol pervaporation method, and the separation factor and the flux were measured. The results are shown in Table 1.

Comparative Example 4

A carbon membrane laminated body was manufactured in the same manner as in Comparative Example 2 except that a lignin was used instead of a polyimide resin for a solution for forming the underlayer precursor. The amount of the lignin added thereto was 10% by mass with respect to the entire solution for forming an underlayer precursor. After the carbonization, the carbon membrane underlayer had a film thickness of 1 μm. The average pore diameter of the carbon membrane is shown in the column of "Underlayer" in Table 1. A separation test was performed by a water-ethanol pervaporation method, and the separation factor and the flux were measured. The results are shown in Table 1.

Comparative Example 5

A carbon membrane laminated body was manufactured in the same manner as in Comparative Example 1 except that a lignin was used instead of a polyimide resin for a solution for forming the underlayer precursor. The amount of the lignin added thereto was 10% by mass with respect to the entire solution for forming an underlayer precursor. After the carbonization, the carbon membrane underlayer had a film thickness of 1 μm. The average pore diameter of the carbon membrane is shown in the column of "Underlayer" in Table 1. A separation test was performed by a water-ethanol pervaporation method, and the separation factor and the flux were measured. The results are shown in Table 1.

It can be understood from Table 1 that the carbon membrane laminated bodies of Examples 1 and 2, each of which has both a carbon membrane underlayer and a carbon membrane separation layer, are excellent in both the separation factor (separation performance) and the flux.

INDUSTRIAL APPLICABILITY

A carbon membrane laminated body of the present invention can widely be used for, for example, a filter for selectively separating a specific substance (e.g., gas) from a mixture of a plurality of substances (e.g., gas).

The invention claimed is:

1. A carbon membrane laminated body comprising:
a porous substrate,
a first porous carbon membrane as a carbon membrane underlayer disposed on a surface of the porous substrate and having an average pore diameter of 0.20 to 0.65 nm, and
a second porous carbon membrane as a carbon membrane separation layer disposed on a surface of the carbon membrane underlayer, having a smaller film thickness and a smaller average pore diameter than those of the carbon membrane underlayer.

2. A carbon membrane laminated body according to claim 1, wherein the carbon membrane underlayer and the carbon membrane separation layer are formed by carbonizing a carbon membrane underlayer precursor as an underlayer precursor disposed on a surface of the porous substrate and a carbon membrane separation layer precursor as a separation layer precursor disposed on a surface of the underlayer precursor at 400 to 1000° C. in a non-oxidation atmosphere.

3. A carbon membrane laminated body according to claim 2, wherein the underlayer precursor is a layer containing a polyimide resin as a main component.

4. A carbon membrane laminated body according to claim 2, wherein the separation layer precursor is a layer containing lignin as a main component.

5. A carbon membrane laminated body according to claim 1, wherein the carbon membrane underlayer has a thickness of 0.05 to 5.0 μm, and the carbon membrane separation layer has a thickness of 0.001 to 1.0 μm.

6. A carbon membrane laminated body according to claim 1, wherein the carbon membrane separation layer has an average pore diameter of 0.1 nm to less than that of the carbon membrane underlayer.

7. A carbon membrane laminated body according to claim 6, wherein the carbon membrane separation layer has an average pore diameter of 0.1 nm to less than that of the carbon membrane underlayer.

8. A method for manufacturing a carbon membrane laminated body comprising the steps of:
disposing a first carbon membrane precursor as an underlayer precursor on a porous substrate to form an underlayer precursor-disposed body,
disposing a second carbon membrane precursor as a separation membrane precursor which is thinner than the underlayer precursor on a surface of the underlayer precursor to form a carbon membrane precursor laminated body, and
subjecting the carbon membrane precursor laminated body to a thermal treatment for carbonization of the underlayer precursor and the separation layer precursor to form respectively a carbon membrane underlayer disposed on a surface of the porous substrate and a carbon membrane separation layer disposed on a surface of the carbon membrane underlayer;
the carbon membrane underlayer having an average pore diameter of 0.20 to 0.65 nm and the carbon membrane separation layer having a smaller average pore diameter and a smaller film thickness than those of the carbon membrane underlayer.

9. A method for manufacturing a carbon membrane laminated body according to claim 8, wherein the thermal treatment is performed at 400 to 1000° C. in a non-oxidation atmosphere.

10. A method for manufacturing a carbon membrane laminated body according to claim 8, wherein the underlayer precursor is a layer containing a polyimide resin as a main component.

11. A method for manufacturing a carbon membrane laminated body according to claim 8, wherein the separation layer precursor is a layer containing lignin as a main component.

12. A method for manufacturing a carbon membrane laminated body according to claim 8, wherein the carbon membrane underlayer has a thickness of 0.05 to 5.0 μm, and the carbon membrane separation layer has a thickness of 0.001 to 1.0 μm.

13. A method for manufacturing a carbon membrane laminated body according to claim 8, wherein the carbon membrane separation layer has an average pore diameter of 0.1 nm to less than that of the carbon membrane underlayer.

14. A method for manufacturing a carbon membrane laminated body according to claim 12, wherein the carbon membrane separation layer has an average pore diameter of 0.1 nm to less than that of the carbon membrane underlayer.

* * * * *

UNITED STATES PATENT AND TRADEMARK OFFICE
CERTIFICATE OF CORRECTION

| | | |
|---|---|---|
| PATENT NO. | : 7,891,499 B2 | |
| APPLICATION NO. | : 12/471532 | |
| DATED | : February 22, 2011 | |
| INVENTOR(S) | : Akimasa Ichikawa and Miyuki Yabuki | |

It is certified that error appears in the above-identified patent and that said Letters Patent is hereby corrected as shown below:

<u>Column 13</u>

*Line 36*: please change "6" to --5--

Signed and Sealed this
Tenth Day of May, 2011

David J. Kappos
*Director of the United States Patent and Trademark Office*